(12) United States Patent
Ocali et al.

(10) Patent No.: US 8,947,423 B2
(45) Date of Patent: Feb. 3, 2015

(54) DIRECT 3-D DRAWING BY EMPLOYING CAMERA VIEW CONSTRAINTS

(75) Inventors: Ogan Ocali, Urla Izmir (TR); Ali Erol, Karsiyaka Izmir (TR); Umut Sezen, Urla Izmir (TR)

(73) Assignee: Ocali Bilisim Teknolojileri Yazilim Donanim San. TIC. A.S. (TR)

( * ) Notice: Subject to any disclaimer, the term of this patent is extended or adjusted under 35 U.S.C. 154(b) by 215 days.

(21) Appl. No.: 12/950,750

(22) Filed: Nov. 19, 2010

(65) Prior Publication Data

US 2011/0285696 A1 Nov. 24, 2011

Related U.S. Application Data

(60) Provisional application No. 61/262,829, filed on Nov. 19, 2009.

(51) Int. Cl.
*G06T 1/00* (2006.01)
*G06T 15/00* (2011.01)
*G06T 17/00* (2006.01)
*G09G 5/00* (2006.01)
*G06K 9/00* (2006.01)
*G06F 17/00* (2006.01)
*G06T 19/20* (2011.01)

(52) U.S. Cl.
CPC . *G06T 1/00* (2013.01); *G06T 19/20* (2013.01); *Y10S 715/964* (2013.01)
USPC .......... 345/419; 345/418; 345/420; 345/619; 345/629; 345/630; 345/632; 345/633; 345/672; 345/676; 345/677; 345/678; 345/679; 345/680; 382/154; 715/211; 715/964

(58) Field of Classification Search
CPC ....... G06T 15/005; G06T 19/00; G06T 17/20; G06T 11/60; G06T 11/00; G06T 19/006; G06T 11/203; G09G 5/14; G09G 2340/10; G06F 3/0484; G06F 3/04845; G06F 3/04812; G06F 3/04815; G06F 3/0481; G06F 17/50
USPC ......... 345/419–420, 672, 676–680, 418, 619, 345/629, 630, 632, 633; 703/98; 382/154; 715/211, 964
See application file for complete search history.

(56) References Cited

U.S. PATENT DOCUMENTS

| | | | |
|---|---|---|---|
| 5,798,761 A | 8/1998 | Isaacs | |
| 6,084,592 A | 7/2000 | Shum et al. | |
| 6,246,412 B1 | 6/2001 | Shum et al. | |
| 6,271,855 B1 | 8/2001 | Shum et al. | |

(Continued)

OTHER PUBLICATIONS

Bunnun, P. et al., "OutlinAR: an assisted interactive model building system with reduced computational effort," 7th IEEE/ACM International Symposium on Mixed and Augmented Reality, 2008, ISMAR 2008, IEEE, Piscataway, New Jersey, Sep. 15, 2008, pp. 61-64.
Hertzmann, A., "Interactive 3D Scene Reconstruction from Images," NYU CS Technical Report 1999-783, Apr. 22, 1999, New York University, Department of Computer Science, retrieved from the internet: URL:http://www.mrl.nyu.edu/hertzman/hertzmann-scuplt.pdf, 8 pages.

(Continued)

*Primary Examiner* — Ke Xiao
*Assistant Examiner* — Jed-Justin Imperial
(74) *Attorney, Agent, or Firm* — Aka Chan LLP

(57) ABSTRACT

An interactive 3-D drawing method supports 3-D modeling of real-world scenes captured in the form of multiple images taken from different locations and angles. The method enables the user manipulate a 3-D drawing primitive without changing its appearance on a selected input image.

25 Claims, 13 Drawing Sheets

(56) References Cited

U.S. PATENT DOCUMENTS

| | | | |
|---|---|---|---|
| 2004/0196282 A1* | 10/2004 | Oh | 345/419 |
| 2005/0001852 A1* | 1/2005 | Dengler et al. | 345/633 |
| 2009/0085910 A1 | 4/2009 | Elsberg et al. | |
| 2009/0244062 A1* | 10/2009 | Steedly et al. | 345/420 |
| 2010/0265255 A1* | 10/2010 | Iwamoto | 345/442 |

OTHER PUBLICATIONS

Hong, Wu, et al., "Photogrammetric reconstruction of free-form objects with curvilinear structures," The Visual Computer; International Journal of Computer Graphics, Springer, Berlin, Germany, vol. 21, No. 4, May 2005, pp. 203-216.

* cited by examiner

View-2

View-2

View-2

View-3

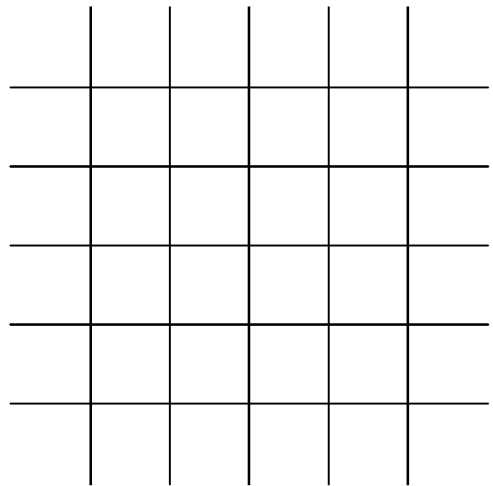

Figure 6C

| INTERNAL PARAMETERS | | |
|---|---|---|
| FOCAL LENGTH | $f$ | THE DISTANCE OF THE IMAGE PLANE TO THE OPTICAL CENTER |
| SENSOR HEIGHT | $h$ | THE HEIGHT OF THE IMAGE PLANE IN MILLIMETERS |
| IMAGE HEIGHT | $H$ | THE HEIGHT OF THE IMAGE IN PIXELS |
| PRINCIPAL POINT | $(p_x, p_y)$ | THE PIXEL COORDINATE OF THE INTERSECTION OF Z AXIS WITH THE IMAGE PLANE |
| EXTERNAL PARAMETERS | | |
| OPTICAL CENTER | $o$ | THE CENTER OF PROJECTION FOR THE CAMERA |
| X AXIS | $u_x$ | THE UNIT VECTOR CORRESPONDING TO THE X AXIS OF THE IMAGE PLANE |
| Y AXIS | $u_y$ | THE UNIT VECTOR CORRESPONDING TO THE Y AXIS OF THE IMAGE PLANE |
| Z AXIS | $u_z$ | $(u_z = u_x \times u_y)$, WHICH IS THE NORMAL OF THE IMAGE PLANE |

PERSPECTIVE PROJECTION

GIVEN 3D POINT $q$, ITS PROJECTION $(x_q, y_q)$ CAN BE COMPUTED AS FOLLOWS

LET $$R = \begin{bmatrix} u_x^T \\ u_y^T \\ u_z^T \end{bmatrix} \quad K = \begin{bmatrix} \frac{f}{h}H & 0 & p_x \\ 0 & \frac{f}{h}H & p_y \\ 0 & 0 & 1 \end{bmatrix}$$

THEN $$[q'_x\ q'_y\ q'_z]^T = K[R - Ro]q \quad \text{and} \quad (x_q, y_q) = \left( q'_x/q'_z,\ q'_y/q'_z \right)$$

Figure 7

DIRECT 3-D DRAWING BY EMPLOYING CAMERA VIEW CONSTRAINTS

CROSS-REFERENCE TO RELATED APPLICATIONS

This patent application claims the benefit of U.S. provisional patent application 61/262,829, filed Nov. 19, 2009, which is incorporated by reference along with all other references cited in this application.

BACKGROUND OF THE INVENTION

This invention is related to the generation of three-dimensional (3-D) models from multiple two-dimensional (2-D) images of a scene. More specifically, it can be described as an interactive 3-D reconstruction method in which a reconstruction engine takes model constraints from a user manually.

Image-based 3-D reconstruction of real world objects can be considered as a reverse engineering problem, in which the 3-D geometry of the object (or the scene) has to be found using its 2-D pictures. It forms the basic research problem in the technical fields of computer vision and photogrammetry. A person of ordinary skill in the art would appreciate the problems of this technical field as described below.

Constructing geometric models of real-world objects or places in a computing environment has many fruitful application areas such as production of 3-D animations in the entertainment business (e.g. computer applications, games, advertisements, and movies), making computer-aided design (CAD) and computer-aided manufacturing (CAM) models for production lines, and restoration of buildings. Considerable effort has been invested in the design and development of 3-D modeling software for the fast construction of accurate models.

One approach to modeling of the real world is the use of laser-scanner and image-based reconstruction systems, still being developed through intensive research in computer vision. The laser-scanner based systems suffer especially from high production costs, which hinder their widespread use. Image-based alternatives such as the PhotoModeler Scanner (by EOS Systems Inc. Vancouver, BC, Canada) suffer from lack of robustness in the highly complex problem of image matching. As a matter of fact both of the approaches are incapable of reconstructing semitransparent and specular surfaces, making them unsuitable for a wide range of operational environments. Due to the deficiencies of fully automatic scanner like products, cheap and semiautomatic interactive modeling systems relying much on human supplied constraints to alleviate or completely avoid the complexity of the image matching problem have emerged in the market.

Given multiple images of a scene, the image-based interactive 3-D modeling systems. Given multiple images of a scene, these systems collect some matching point features and angular relations to estimate parameters such as 3-D location, orientation and focal length, and radial distortion of the cameras that take the images. This process is usually referred to as camera calibration. Apart from calibration data, the user supplies the model to be reconstructed in the form of 2-D drawings of the 2-D projections of 3-D primitives making up the model, overlaid on the image. The projection refers to a perspective projection transformation based on a pinhole camera model. In practice there exists a nonlinear deviation from the pinhole model due to the optical lens distortion often represented by a radial transformation on the 2-D image plane. Face boundaries, lines, curves, and vertices of predetermined solid shapes are drawn on the images by marking the corners or tracing the edges in the images. When projections of primitives on multiple cameras or a single projection and some angular constraints such as perpendicularity or parallellity are given, it then becomes possible to reconstruct the model, which is defined to be the 3-D geometry that gives the minimum projection error when projected on the input images. A projection error is the distance on the image plane between the projection of the primitive and the corresponding feature supplied by the user's drawings.

Another interactive modeling system has an interactive reconstruction system that uses panoramic images instead of narrow angle regular images to enable accurate estimation of camera rotation. The user specifies sets of parallel lines and 3-D scene coordinates of some points for camera calibration. Similar to previously mentioned systems, this system relies on the availability of such features in the scene, which are expected to be man-made environments (e.g., buildings). The 3-D model is assumed to be made up of connected planes, whose vertices, orientations, or any combination of the two, relative to other planes are specified by the user. Finally, a system of equations employing all geometric constraints is solved to reconstruct the scene.

Another approach chooses to avoid the complex constraint-based reconstruction and just lets the user draw directly in 3-D while tracking the similarity of the drawing's projection to the features in the image. First cameras are calibrated by matching and scaling vanishing points determined by user specified sets of parallel lines, and then the user is allowed to draw overlaid on the images. The interface guides the user to follow directional constraints perpendicular or parallel to the ground plane or some other parts of the model. When the world coordinate axes are aligned with the ground plane, buildings and similar rectangular structures made up of vertical and parallel planes can be constructed efficiently using the interface due to the directional constraints but it is not very suitable for the reconstruction of other types of objects such as the one made of planes at arbitrary angles to each other. The accuracy of calibration and usefulness of the constraint directions provided by the interface plays an important role in ease of use of this type of interface. Inaccurate calibration and lack of constraints that directly help decrease the projection error leads to a difficult to use interface in which accuracy is sacrificed to a great extent.

A deficiency associated with the interactive reconstruction techniques mentioned so far is the presence of restrictive assumptions on the contents of images and the shapes of the objects (or the scenes) to be reconstructed. These assumptions decrease the generality of the systems. By generality we mean the ability to reconstruct an arbitrary object (or scene). For example, an assumption that the scene is made up planes that are oriented parallel or vertical to each other allows easy and fast reconstruction of buildings or similar structures but reconstruction of shapes such as cylinders become cumbersome. One should device new interaction methods to extend the set of objects to be reconstructed and it is usually not possible to extend the set in a principled way.

Therefore, there is a need for improved 3-D modeling techniques, especially a technique having a camera-based drawing constraint that enables the user draw directly in 3-D while maintaining very low projection error on the available images in a natural way, without restrictive assumptions on the scene content. The technique can be applied to the reconstruction of all types of geometric shapes including free-form surfaces, which are not possible to reconstruct by previous interactive reconstruction methods.

BRIEF SUMMARY OF THE INVENTION

An interactive 3-D drawing method supports 3-D modeling of real-world scenes captured in the form of multiple images taken from different locations and angles. The method enables a user to manipulate a 3-D drawing primitive without changing its appearance on a selected input image. A view-lock, a manipulation constraint, constrains the points on drawing primitives to lie on the 3-D lines that are used to project them on the view to avoid any change in their appearance. Under the view-lock constraint the user can move the primitive to align its appearance on another view, without changing its appearance on the locked view.

The method uses the location and orientation and the internal parameters of the cameras that took the pictures to be known. This information can be obtained from the photographs using camera calibration software. When the camera calibration information is available, it becomes possible to overlay the appearance of a 3-D model on the input images. In this way, the user can draw a 3-D primitive corresponding to a feature overlaid on the image. The method enables a user to manipulate a 3-D drawing primitive without changing its appearance on another input image by restricting the motion of the primitive in a special way. This fixed appearance restriction that we call view-lock allows the user to align the primitive on another image so that its appearance matches the corresponding feature in the image. In theory, if a 3-D model's appearance matches two of the available photographs then it means that the model is a valid reconstruction of the object in the photographs.

The method enables the user manipulate a 3-D drawing primitive without changing its appearance on a selected input image. Essentially, a new manipulation constraint that we call a view-lock is introduced in our invention. A view-lock constrains the points on drawing primitives to lie on the 3-D lines that are used to project them on the view to avoid any change in their appearance. Under the view-lock constraint the user can move the primitive to align its appearance on another view, without changing its appearance on the locked view. Alignment operation corresponds to a motion of the primitive(s) to match its projection to the corresponding features on the image. In principle, two cameras; one used as a view-lock and the other one used as an alignment image, are sufficient to reconstruct the primitive correctly in 3-D; but in practice calibration errors and degenerate camera configurations such as narrow angle camera pairs require exercising the lock and align operations on other cameras as well. The overall process could be seen as a manual optimization process, where the user visually minimizes a subjective qualitative projection error on the images.

A view-lock, a manipulation constraint, constrains the points on drawing primitives to lie on the 3-D viewing-lines that are used to project them on the view to avoid any change in their appearance. In the pinhole camera model the constraint line of a point is the viewing-line that passes through the point and the camera origin. Under the view-lock constraint the user can move the primitive to align its appearance on another view, without changing its appearance on the locked view.

An alignment operation corresponds to a motion of the primitive or primitives to match its projection to the corresponding features on the image. In principle, two cameras (one used as a view-lock and the other one used as an alignment image) are sufficient to reconstruct the primitive correctly in 3-D; but in practice calibration errors and degenerate camera configurations such as narrow angle camera pairs require exercising the lock and align operations on other cameras as well. The overall process could be seen as a manual optimization process, where the user visually minimizes a subjective and qualitative projection error on the images.

In an implementation of this invention, there is a typical 3-D modeling tool that enables the user to draw in 3-D. The user is able to create 3-D lines and curves, manipulate (e.g., move or reshape) these primitives freely, and see the result from an arbitrary view-point and angle. Such software can be implemented on computing systems having a 2-D display as an output device, and a keyboard, a mouse, or a pen as input devices. Other input devices may also be used. Drawing in 3-D through the use of a 2-D interface could be cumbersome in the sense that the 3-D motion or locations are generated from a 2-D cursor motion and location on the screen. A mapping can be implemented by the help of a constraint such as a guiding plane or a guiding-line that the user selects by some means. In a more general setting one can also imagine interfaces based on 3-D displays (e.g. stereo or head mounted displays) and a 3-D mouse (which can even be the user's hand itself in an immersive setup) enabling direct unconstrained manipulation. Such interfaces are very expensive and are still under development, and thus have limited use in the market. Whatever type of interface is used, view-lock mechanisms can be implemented as a special form of motion constraint that guides the user while manipulating the drawing primitives.

In an embodiment of this invention, the user interface in the modeling program is capable of displaying the 3-D model overlaid on the image. With an overlaid display utility for calibrated cameras, the user can be visually guided by the overlay while drawing. Overlay support uses the intrinsic and extrinsic parameters of the cameras that took the images. In a specific implementation, a camera calibration software is used beforehand to estimate location, orientation, and internal parameters such as focal length, skew, aspect ratio and radial distortion of the camera. In an implementation, radial distortion is estimated and removed before the overlay operation to ensure accuracy and practicality of the implementation. Displaying the 3-D drawing in the view of the camera corresponding to the image is sufficient to obtain an overlay on the image.

Although the overall system operates in 3-D, the user mostly operates virtually in 2-D due to the image overlay and alignment operations; therefore there is also a need for a constraint that constrains the primitive motion on a plane parallel to the image plane of the camera, which fits well to the nature of alignment operation to be executed over images. The initial view-lock free alignment, when the primitive is created for the first time and intermediate view-lock free alignments that occur in cases of bad reconstructions are the occasions when this constraint can be utilized.

In an embodiment of the invention, a basic primitive to be view-locked is a point. Constraining a point in 3-D space to lie on the viewing-line passing through an optic center of the chosen perspective camera and the point keeps its projection on the selected view constant. The projection is defined to be the intersection of the image plane and the ray. In cases of orthographic cameras viewing-line would be passing through the point in the direction of the camera (i.e. orthogonal to the image-plane). Therefore when a point is locked on a view, the user is allowed to translate the point on the constraint line. In case of a view-lock free alignment, the point is guided by the plane passing though the point itself and is parallel to the image plane of active camera used for viewing the 3-D model on the display.

A drawing is made up of corners or some guide points, face boundaries, occlusion boundaries and contours on surfaces of an object that can be obtained by tracing the edges on the images. The higher order primitives making up the boundaries come in two forms: (1) polylines or polygons made up of chains of connected line segments as in the case of face boundaries of buildings, and (2) smooth curves corresponding to the boundaries of some curve features on curved objects. The lock and align operation of polylines are implemented through locking and alignment of its vertices, which are basic point primitives, between the line segments. As the perspective or orthographic projection of a 3-D line is a 2-D line, locking the vertices of a polyline is enough to lock the whole polyline on the view.

View-locking of smooth curves is a more elaborate operation. In principle, it is possible to represent smooth curves using polylines but the number of line segments needed and preserving the smoothness can be very impractical to be handled by the user. Using parametric curves with small DOF help create natural looking smooth contours by moving a few control points. In practice, smooth curves are represented by Bezier curves. A cubic Bezier curve is usually enough to capture a wide range of natural boundary shapes. In cases of more complex boundaries Bezier curves can be cascaded. The view-locking of the whole curve on a view is ideally a more complex procedure under perspective projection; however, in cases of affine projection, which is a linear transformation, view-locking the control points of the curve is enough to view-lock the whole curve. View-locking the control points over a perspective camera does not guarantee curve locking ideally but the error introduced (i.e., the motion of the curve on the locked view) is observed to be negligible for camera configurations seen in practice. In an implementation, curve locking is implemented by view-locking the control points of the curve. Aligning the curve with or without view-locks can be handled in two ways: (1) Each control point is moved separately by the user, and (2) the motion vector applied on a single point on the curve is distributed to the control points using a distance metric as a weight.

The alignment process described above consists of drawing curves or lines by tracing the edges on the images. If the curves or lines are close enough to the corresponding edges, it is possible to trace the edges automatically with subpixel precision. Automatic alignment corresponds to a search for the line or the curve having maximum edge strength. The edge strength on a point on the curve can be measured as the directional derivative on the image along the normal direction. The summation of the edge strength of individual points on the curve gives the edge strength of the whole curve. When the search starts at a long distance from the edges on the image, it can get stuck at a local maximum; therefore the initial point should be chosen as close as possible to the target. The optimization process provides means for subpixel localization of the edges.

The lines and boundaries on an object are mostly connected by planes or smooth surfaces. Many objects such as human body and many other organic shapes can be modeled by a single closed surface without any boundary edges. The surfaces of object can be represented as (1) polygonal meshes made up of small planar faces connected to each other or (2) parametric surfaces such as NURBS (Non-uniform Rational B-Spline). Similar to the polygonal boundaries, the lock and align operation of polygonal meshes are implemented through vertices, which are basic point primitives. As each face in a mesh is a plane bounded by a closed polygon, its appearance on a selected view can be preserved exactly by locking its vertices. In case of parametric surfaces, the locking and aligning the control points is the method to implement the lock and align operation under linear camera models. Practice showed us that control point locking is a good approximation under natural camera configurations. Manipulation of smooth surfaces is a more complex process. One possibility is to move the vertices or control points one by one. Another possibility is the use of complex tools such as sculpturing, subdivision or smoothing that move multiple primitives at the same time. What ever the method of manipulation method is, the user interface should merely restrict the motion of each vertex or control point to their viewing-lines in order to implement view-locking over surfaces.

Aligning a surface over multiple photographs corresponds to a scanner-like reconstruction operation where the surface of an object in the photographs is constructed. In image-based reconstruction an initial surface estimate is refined so that the color content of its projection (or its appearance) on multiple views is consistent in terms of color content. In case of a Lambertian surface model, the consistency implies that the projection of a surface point has the same color on all images that see it. The image matching process can be considered as a method to automatically align a view-locked surface on another view. Depending on the quality of images, the visual properties of the surface, and the initial estimate of the surface, it is possible to reconstruct surfaces with very high precision through image matching.

In a specific implementation, the images and camera calibration procedure are used only for drawing purposes. One can imagine a modeling process where the 3-D model is first sketched as a 2-D drawing from multiple views. The 2-D sketches created in this way could be considered as an input image and they can be drawn on the fly using a 3-D modeling tool and 2-D motion constraint used in alignment. When the viewing camera used in drawing is saved and a mechanism to lock on the corresponding view is provided, the system becomes equivalent to the one using 2-D drawings as if there were images. An extension for imageless operation mode is a mechanism to switch back to the views used for locking before. Note that in an embodiment of the invention, the two modes of operation can be combined seamlessly.

An important issue related to the implementation of the line constraint is the discontinuity in motion when the vanishing point of the viewing-line is inside or close to the 2-D view of the scene. The motion of the point is implemented by mapping a 2-D coordinate of the cursor to a location on the 3-D line. One approach to implement this mapping is to find the closest points on the constraint line and a viewing ray passing through the optical center and the cursor location. This approach can be implemented when the vanishing point is not visible. But in the presence of vanishing points, closest point computation can be unstable, introduce discontinuities in motion, and end up with a point behind the viewing camera. In an implementation of the invention, to avoid anomalies in motion, the cursor location is first mapped to a 2-D point on the projection of the viewing-line and the 3-D position is set to be the point on the 3-D viewing-line projecting on the mapped point. If this location is found to be behind the viewing camera, it is discarded and motion is not allowed. This mapping issue can be addressed by mapping the 2-D cursor location to the closest point on the projection of the guiding-line and explicitly clipping the mapping according to the distance to the vanishing point on the screen. What is needed is a different approach of handling the mapping and detecting and handling invalid mappings, which can be applied to any line independent from the location of its vanishing point and is free from any discontinuity.

In an implementation, an interactive 3-D reconstruction and modeling method of direct 3-D drawing using 2-D images of a scene taken from different views and the corresponding calibrated camera parameters in a typical 3-D modeling environment with the capability to display what is being drawn overlaid on the images, includes: a new manipulation constraint that we call "view-lock"; alignment of view-locked primitives on other images; a "lock-and-align" procedure to reconstruct primitives in 3-D; and lock-free alignment of primitives on images.

View-lock is a mechanism that enables the user to manipulate a 3-D drawing primitive comprising the 3-D model without changing its appearance on a selected input image. Alignment of view-locked primitives on other images includes moving them in 3-D under the locked constraint to match their appearance to the corresponding features on other images. A lock-and-align procedure to reconstruct primitives in 3-D is a process consisting of view-locking on one image and aligning on another; and optionally repeating it on other views to improve reconstruction accuracy. Lock-free alignment of primitives on images is moving them on a 3-D plane parallel to the current viewing camera to match their appearance to the corresponding features on other images in case of initialization of primitives over an image or very inaccurate and low-quality reconstructions.

The primitive to be reconstructed is a point. The primitive to be reconstructed is a polyline or polygon. The primitive to be reconstructed is a smooth curve such as a Bezier curve, NURBS, Spline, B-spline, which are linear functions of their control points. Automatic alignment of primitives to the edges on the images through a search for the best primitive along which the edge strength is maximum. Mapping 2-D cursor locations to points on a 3-D line. Use the method for camera views without images as a drawing tool.

In an implementation, a computer-implemented method includes: providing a 3-D drawing based on 2-D images of a scene taken from multiple different views, where the 3-D drawing has a plurality of 3-D drawing primitives; permitting the 3-D drawing primitives to be drawn on a computer screen overlaid on the 2-D images; using a computer, allowing a user to manipulate a 3-D drawing primitive in a view-locked mode, where in the view-locked mode, altering of an appearance of the 3-D drawing primitive occurs without changing its appearance on a selected input image; allowing the user to move the 3-D drawing primitive in 3-D under a locked constraint to match its appearance to corresponding features on other 2-D images; allowing view-locking of the 3-D drawing primitive on one 2-D image while aligning on the another 2-D image; and allowing moving of the 3-D drawing primitive on a 3-D plane parallel to a current viewing camera to match its appearance to the corresponding features on other images.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 6C shows removal of the radial distortion.

FIG. 7 shows internal parameters, external parameters, and perspective projection of a pinhole camera model.

DETAILED DESCRIPTION OF THE INVENTION

Figure 1:
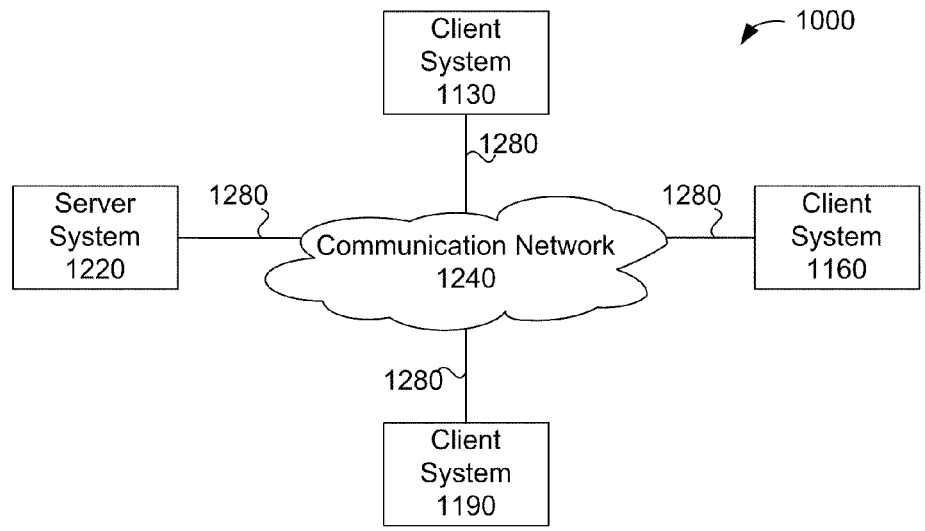
FIG. 1 shows a block diagram of a client-server system and network in which an embodiment of the invention may be implemented.

FIG. 1 is a simplified block diagram of a distributed computer network 1000 which may include an implementation of the present invention. Computer network 1000 includes a number of client systems 1130, 1160, and 1190, and a server system 1220 coupled to a communication network 1240 via a plurality of communication links 1280. There may be any number of clients and servers in a system. Communication network 1240 provides a mechanism for allowing the various components of distributed network 1000 to communicate and exchange information with each other.

Communication network 1240 may itself be comprised of many interconnected computer systems and communication links. Communication links 1280 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 1240 is the Internet, in other embodiments, communication network 1240 may be any suitable communication network including a local area network (LAN), a wide area network (WAN), a wireless network, an intranet, a private network, a public network, a switched network, and combinations of these, and the like.

Distributed computer network 1000 in FIG. 1 is merely illustrative of an embodiment incorporating the present invention and does not limit the scope of the invention as recited in the claims. One of ordinary skill in the art would recognize other variations, modifications, and alternatives. For example, more than one server system 1220 may be connected to communication network 1240. As another example, a number of client systems 1130, 1160, and 1190 may be coupled to communication network 1240 via an access provider (not shown) or via some other server system.

Client systems 1130, 1160, and 1190 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 1220 is responsible for receiving information requests from client systems 1130, 1160, and 1190, performing processing required to satisfy the requests, and for forwarding the results corresponding to the requests back to the requesting client system. The processing required to satisfy the request may be performed by server system 1220 or may alternatively be delegated to other servers connected to communication network 1240.

Client systems 1130, 1160, and 1190 enable users to access and query information stored by server system 1220. In a specific embodiment, a "Web browser" application executing on a client system enables users to select, access, retrieve, or query information stored by server system 1220. Examples of Web browsers include the Internet Explorer browser program provided by Microsoft Corporation, and the Firefox browser provided by Mozilla Foundation, and others.

Software incorporating the invention may be distributed by transmitting or downloading from a server to a client device. The software can be a plug-in to another application program. This plug-in can be downloaded from a server to a client machine, where it is installed. The plug-in can be accessed from, for example, a menu, of the host program; the plug-in will provide new and expanded functionality to the host program. Alternatively, the plug-in software may reside on a server (not downloaded) in a cloud computing environment, and will be called upon by host program when needed. The software can be a standalone desktop application. This software may reside on a desktop computer such on its hard drive. Or the standalone application can be accessed via cloud computing, residing on a hard drive of a server.

Figure 2:
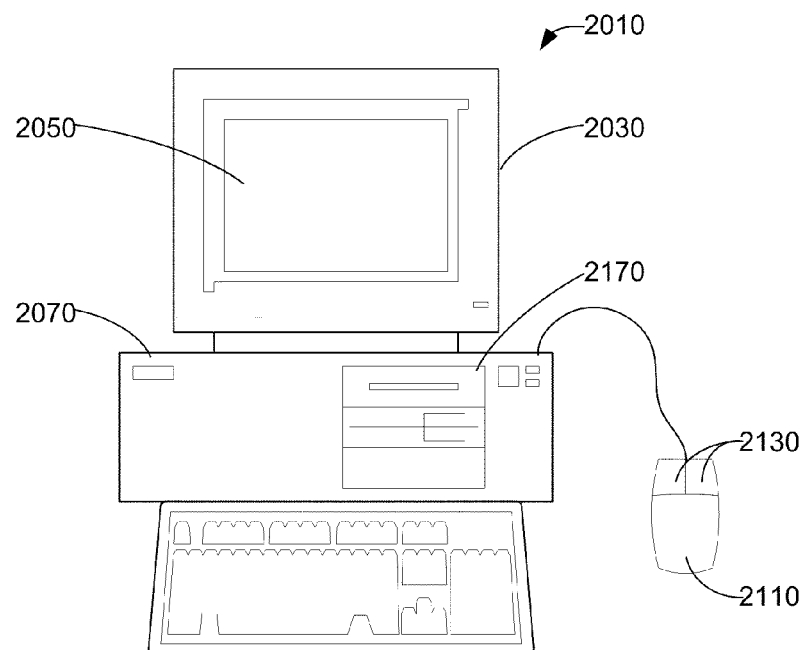
FIG. 2 shows a diagram of an exemplary client or computer which may be used in an implementation of the invention.

FIG. 2 shows a diagram of an exemplary client or computer which may be used in an implementation of the invention. In an embodiment, software incorporating the invention executes on a computer workstation system, such as shown in FIG. 2. FIG. 2 shows a computer system 2010 that includes a monitor 2030, screen 2050, enclosure 2070, keyboard 2090, and mouse 2110. Mouse 2110 may have one or more buttons such as mouse buttons 2130. Enclosure 2070 (may also be referred to as a system unit, cabinet, or case) houses familiar computer components, some of which are not shown, such as a processor, memory, mass storage devices 2170, and the like.

Mass storage devices 2170 may include mass disk drives, floppy disks, magnetic disks, optical disks, magneto-optical disks, fixed disks, hard disks, solid state disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 2170. The source code of the software of the present invention may also be stored or reside on mass storage device 2170 (e.g., hard disk, magnetic disk, tape, or CD-ROM). As a further example, code of the invention may be transmitted via wires, radio waves, or through a network such as the Internet.

Figure 3:
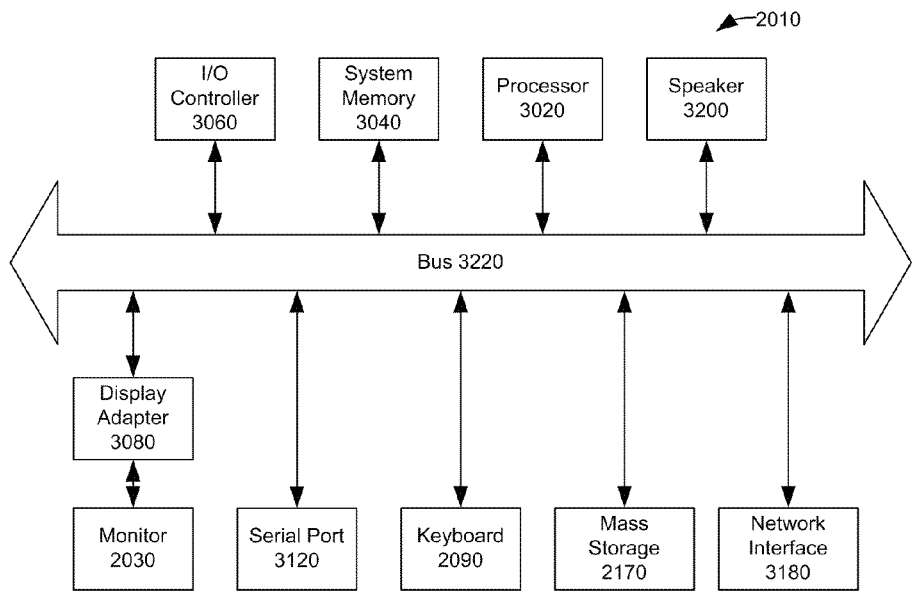
FIG. 3 shows a system block diagram of a client computer system used to execute software of the invention.

FIG. 3 shows a system block diagram of computer system 2010 used to execute software of the present invention. As in FIG. 2, computer system 2010 includes monitor 2030, keyboard 2090, and mass storage devices 2170. Computer system 2010 further includes subsystems such as central processor 3020, system memory 3040, input/output (I/O) controller 3060, display adapter 3080, serial or universal serial bus (USB) port 3120, network interface 3180, and speaker 3200. The invention may also be used with computer systems with additional or fewer subsystems. For example, a computer system could include more than one processor 3020 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 3220 represent the system bus architecture of computer system 2010. However, these arrows are illustrative of any interconnection scheme serving to link the subsystems. For example, speaker 3200 could be connected to the other subsystems through a port or have an internal connection to central processor 3020. Computer system 2010 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 4:
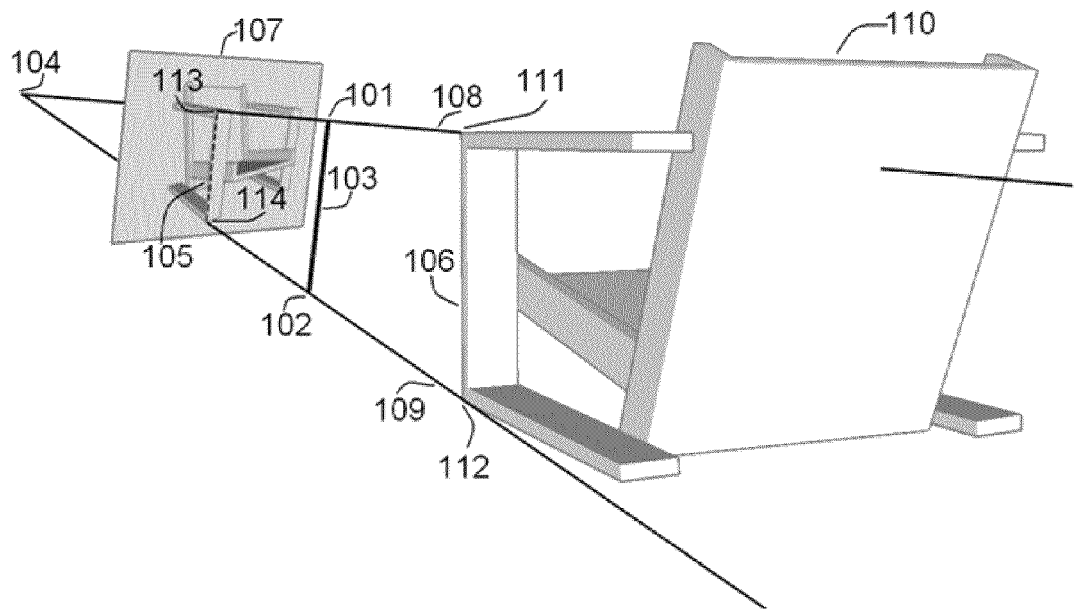
FIG. 4 shows a geometry of a view-lock constraint.

This application discusses a view-lock. A purpose of a view-lock is to keep the appearance of a 3-D primitive constant on a perspective camera view. FIG. 4 depicts a geometry of a view-lock applied on a line-segment primitive 103, and introduces basic concepts of a pinhole camera model and view-lock constraint. The figure shows image 107 of an armchair 110 taken from a view-point 104. The image is formally the projection of the armchair on a 2-D surface called the image-plane by employing a pinhole camera model-based image formation process. The ray connecting view-point 104 and a point on the armchair is called a viewing-ray. Intersection of a viewing ray and the image plane is called the projection of the corresponding point.

The figure shows two projections and their corresponding viewing-lines:

(i) Regarding the first projection, a projection 113 of a point 111 on armchair 110 is the intersection of image-plane 107 and a viewing-line 108, which passes through view-point 104 and point 111.

(ii) Regarding the second projection, a projection 114 of a point 112 on armchair 110 is the intersection of image-plane 107 and a viewing-line 109, which passes through view-point 104 and point 112.

From the definition of two projections, it is easy to deduce that any 3-D line-segment (including a side edge 106 of armchair 110) having its end points on viewing rays 108 and 109 appears as a line-segment 105 between projections 113 and 114 on image 107. View-locking the 3-D line-segment 103 having end points 101 and 102 on the view represented by view-point 104 and image plane 107 implies preventing its appearance 105 to change when the user manipulates the line-segment. In a specific implementation, to implement a view lock for line-segment 103, the modeling software constrains end-points 101 and 102 to be on viewing-lines 108 and 109 respectively.

In an implementation, line-segment 103 can be reconstructed in a modeling application by finding its correct 3-D location 106 as shown in FIG. 4. As any line-segment lying between constraint lines 108 and 109 have the same projection 105, it is not possible to reconstruct line-segment 103 using only one image. As shown in FIGS. 5A-5F, at least two views are used for a full 3-D reconstruction. In an implementation, a user goes through a lock-and align procedure comprising view-locking the line-segment on one view, and then aligning it on the other to reconstruct it correctly.

Figure 5A:
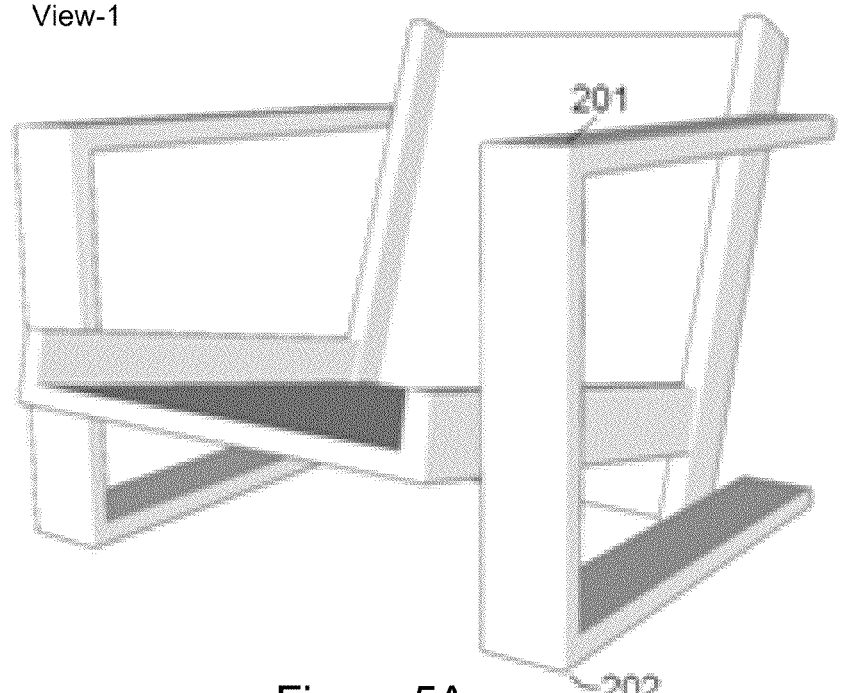
FIGS. 5A-5F show a view-lock and align operation on an object.
Figure 5B:
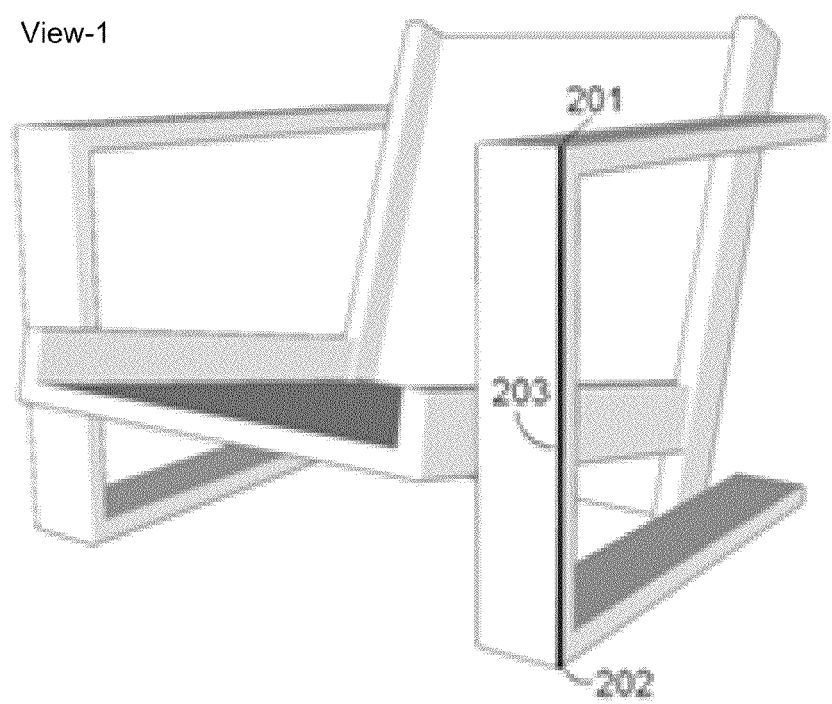
Figure 5C:
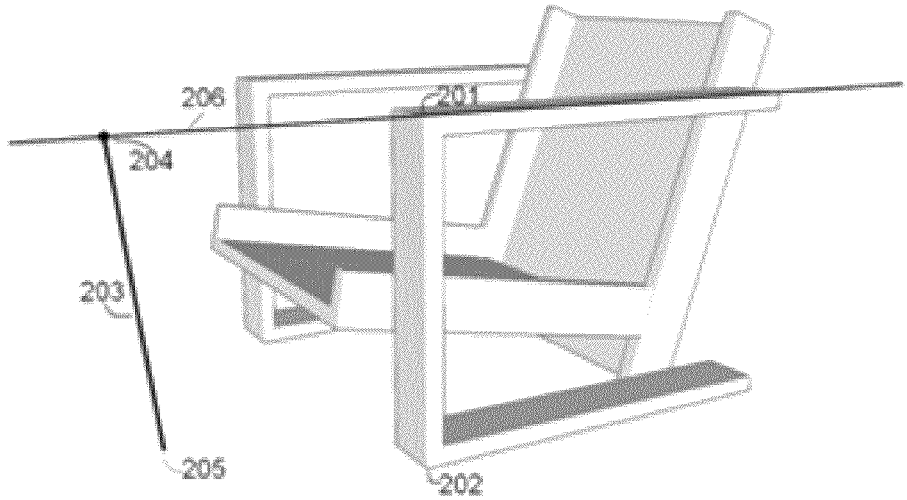
Figure 5D:
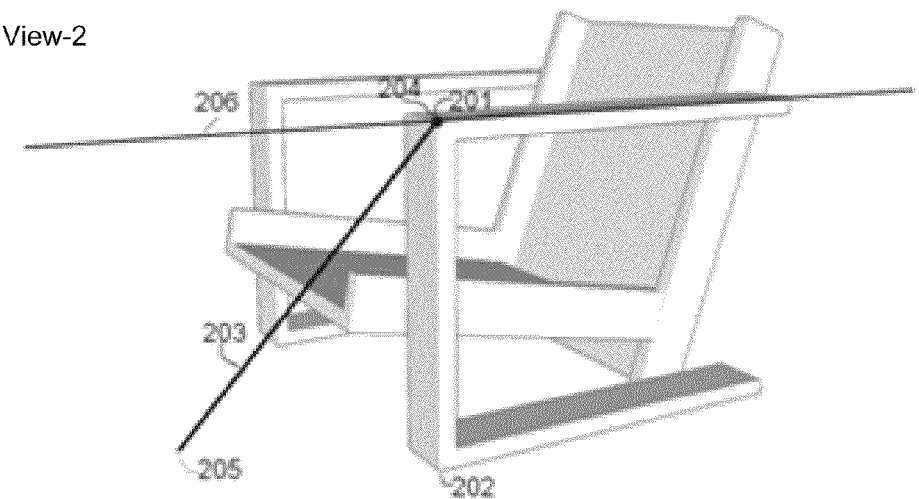
Figure 5E:
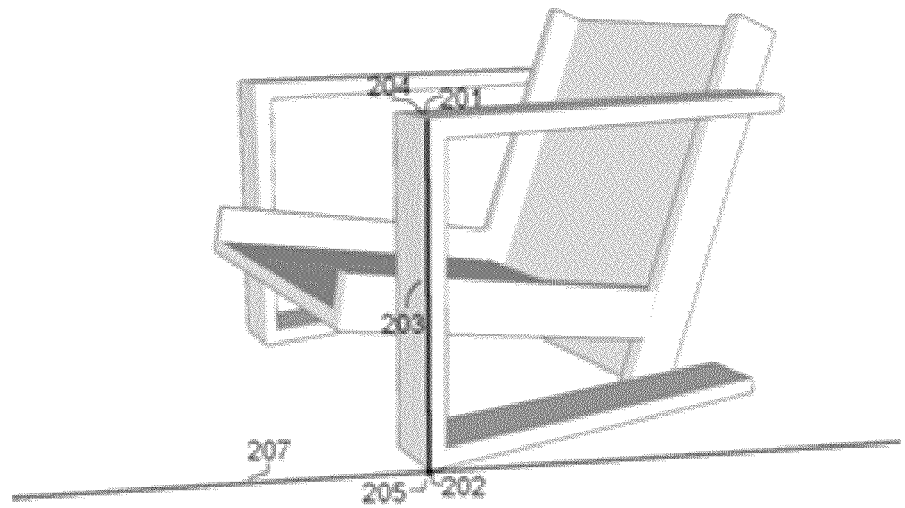

FIGS. 5A-5F show the view-lock and align operation on an object and demonstrate a reconstruction process for a line-segment 203 (see FIG. 5B). FIG. 5A-5E show two views, view-1 and view-2, of an image of a 3-D object, and a lock-and-align operation.

In an implementation, the lock-and-align procedure consists of the following processing steps. A specific process flow is presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented here and may be modified or altered as appropriate for a particular application.

1. Switch to view-1: A user can set the active view to be view-1, and the program displays the 3-D model being drawn overlaid on the image of view-1 (see FIG. 5A).

2. Lock-free align on view-1: The user draws line segment 203 between vertices 201 and 202 overlaid on the image to align it with the edge of the armchair between vertices 201 and 202 to be reconstructed as shown in FIG. 5B. The overlaid drawing operation is essentially a 2-D drawing process where the user draws on a 2-D plane parallel to the image-plane of view-1. The program chooses the 3-D plane by some means and then map cursor motion to a drawing on the plane. It is also possible to use automatic alignment when line-segment 203 comes close to the side edge of the armchair. More information on automatic alignment is described below.

3. View-lock on view-1: The user issues a view-lock command when the line-segment being drawn is aligned as shown in FIG. 5B. In an implementation, the program saves the lock for later use when the user switches to other views. In an implementation, once the primitive is locked on one view it is impossible to manipulate it in any way over that view.

4. Switch to view-2: The user can set the active view to be view-2, which shows line-segment 203 overlaid on the image of view-2 (see FIG. 5C). As it is not possible to estimate the depth using one image the line-segment appears quite far from the primitive to be reconstructed, which is the edge of the armchair between vertices 201 and 202.

5. Locked align on view-2: The user moves an end 204 of line-segment 203 to align with vertex 201 of the armchair (see FIG. 5D). As the line-segment is locked, the program restricts the motion on a viewing line 206 automatically to ensure the line-segments appearance on view-1 does not change as shown in FIG. 5B. The user manipulates an end 205, the other end of the line-segment, similarly to align it with vertex 202 (see FIG. 5E). This time the program uses viewing-line 207 as a guide. Finally the line-segment appears correctly aligned with the edge between vertices 201 and 202. It is possible to use automatic alignment when line-segment 203 comes close to the side edge of the armchair.

Figure 5F:
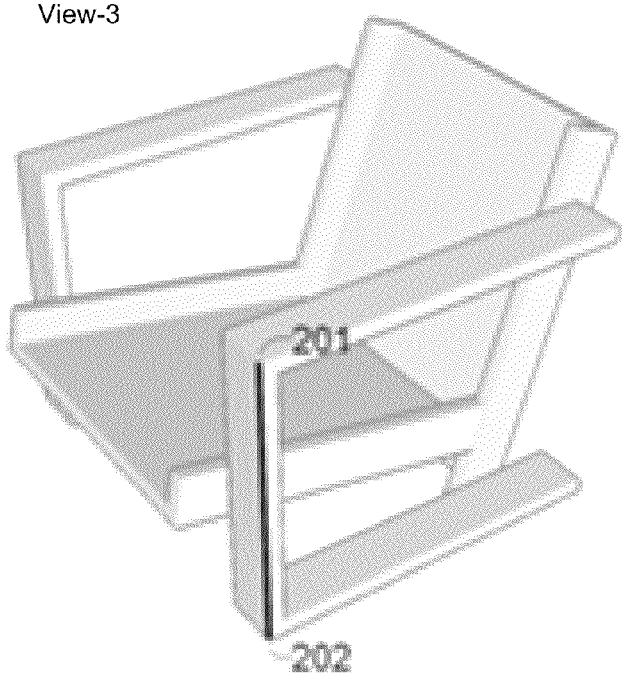

6. Check reconstruction quality: As line-segment 203 appears correctly aligned with the edge of the armchair between vertices 201 and 202 on two views, the reconstruction is complete. One way to check the quality of this reconstruction is switching to another view where the line-segment is visible and check its alignment. FIG. 5F shows a view-3 of the object. In this specific example we see a perfect alignment on view-3, which means an acceptable reconstruction.

7. Go to step 1 if quality-check fails: Due to camera calibration errors and bad camera configurations, two cameras may not be enough to reconstruct the primitive correctly. If the quality-check fails choose another view-1 and view-2 and repeat the operations starting from step 1. Otherwise the reconstruction of line-segment 203 is completed.

In an implementation, other camera models are used during modeling. The camera model determines the projection of a point and therefore effects the definition of viewing lines. In cases of an orthographic camera, there is no view-point but only a viewing direction determined by the normal of the image plane and the viewing-line of a point that passes through the point in the camera direction. For example, viewing-line 108 shown in FIG. 4 would pass through point 111 and be orthogonal to image plane 107 if the camera used were an orthographic one.

In the following subsections implementation details of the invention are presented. Specifically a camera model is used in the implementations, locking and aligning geometric primitives of points, polyline and smooth curves, and an automatic alignment process is explained in detail.

Perspective Camera Model and the Operational Environment

In a specific embodiment of the invention, camera calibration is used. Camera calibration corresponds to estimating the internal and external parameters of the camera; otherwise it will not be possible to compute the view-lock constraints and to overlay the 3-D drawing on the images. An issue related to camera calibration output is its compatibility with standard computer graphics engines such as DirectX® and OpenGL® and existing 3-D modeling tools. Trademarks are the property of their respective owners. DirectX® is a registered trademark of Microsoft Corporation. OpenGL is a registered trademark of Silicon Graphics, Incorporated.

Figure 6A:
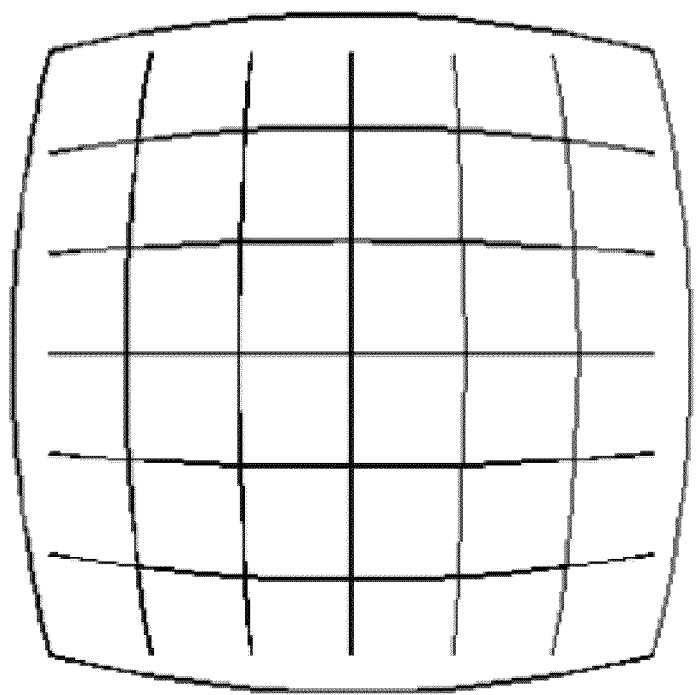
FIGS. 6A-6B show an example of a radial distortion.
Figure 6B:
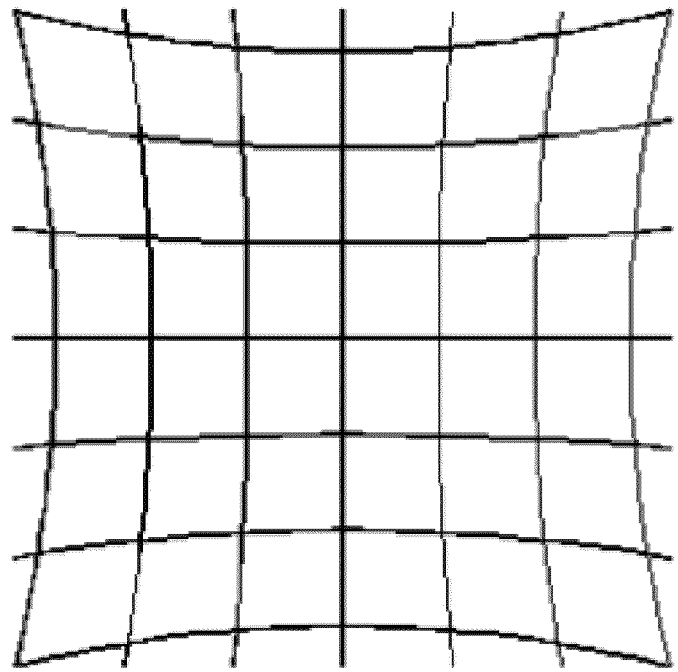

A typical camera available in the market closely approximates an ideal pinhole camera model, which is also the model used in standard computer graphics engines and modeling tools; however, physical constraints on the lenses result in deviation from the pinhole camera model. Of importance, lenses introduce a special type of nonlinear distortion called radial distortion on the images. FIGS. 6A-6B show an example of radial distortion. This distortion violates the basic principle that projection of a line is a line; therefore it is typically difficult to handle in a view-lock implementation. As demonstrated in FIG. 6C, it is possible to remove the radial distortion from an image. After radial distortion removal, the remaining portion can be reliably modeled as ideal perspective projection. In an implementation of a technique of the invention, radial distortion is removed before processing the image further.

FIG. 7 shows a table of internal parameters, external parameters, and perspective projection computations for a camera. In an implementation, an ideal pinhole camera is represented by these parameters. Calibration software may provide the skew between the x- and y-axes of the camera and a nonuniform scaling factor across vertical and horizontal axes of the image plane due to the nonsquare shape of charge-coupled device (CCD) sensors. For many modern cameras the skew will be negligible and CCD elements will be very close to a perfect square. Even if these conditions are violated it is possible to reflect these extra parameters by an image transformation applied on the input image similar to the radial distortion removal transformation.

View-Lock and Alignment for Points

In an implementation of a system, there are two types of constraints to be applied on point features: 1) a view-locked alignment constraint, and a 2) view-lock free alignment constraint. The view-lock constraint has one DOF corresponding to motion on a line. Given a 3-D point $p_0$ and the parameters of the camera used to lock the point, the point is constrained on a line:

$$p = p_0 + \lambda \frac{p_0 - o}{\|p_0 - o\|}$$

where $\lambda$ denotes the single DOF and $o$ denotes the optical center of the camera defined in FIG. 7. The latter constraint has two DOF corresponding to motion on a plane, which can be formulated for a given active camera used to view the scene as:

$$p = p_0 + \alpha u_x + \beta u_y$$

where $\alpha$ and $\beta$ denote the two DOF and $u_x$ and $u_y$ denote the camera axes defined in FIG. 7.

Viewing-Line Constraint in Motion

Figure 8A:
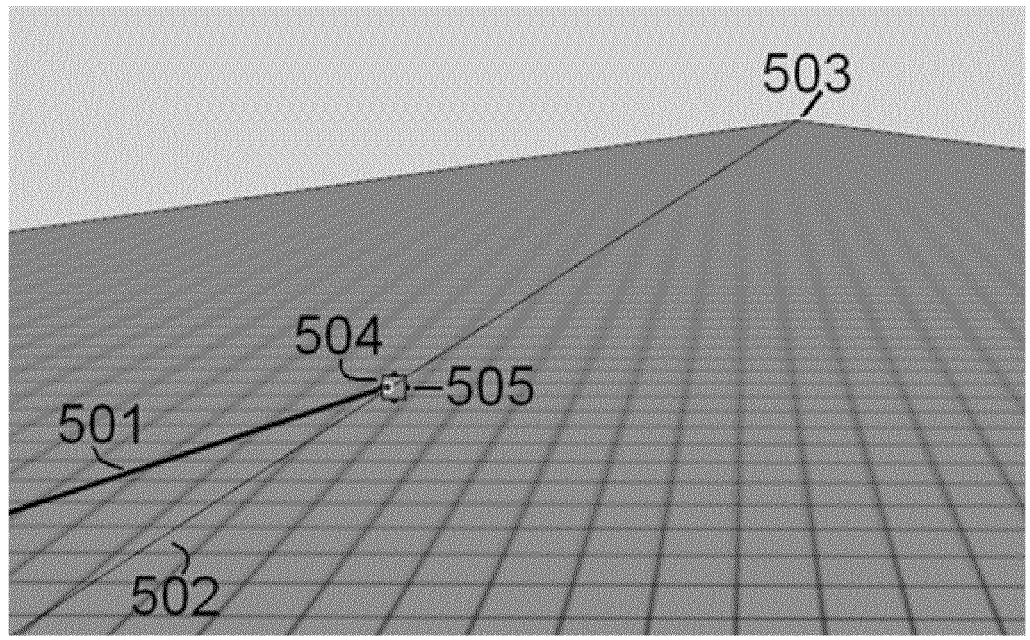
FIGS. 8A-8B shows a mapping of a cursor location to points on viewing-lines with visible vanishing points.
Figure 8B:
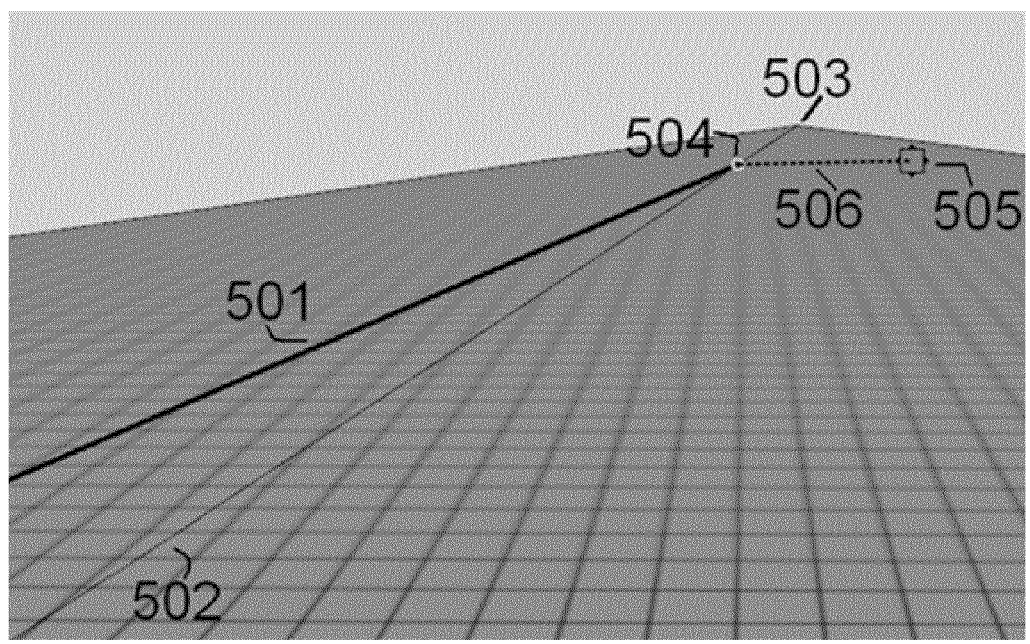

An issue to be considered in cases of view-locked alignment is to take care of vanishing points of viewing-lines. When a vanishing point is visible to the user, it can be reached using a mouse and the point being aligned can be sent to infinity or behind infinity causing motion in the opposite direction of the cursor and mapping behind the active camera. Such discontinuities in motion distract the user and should be avoided. FIGS. 8A-8B show a cursor location mapped to a point on a projection of a viewing-line. An end point or point 504 of a line segment 501 is being moved along a viewing-line 502 extending to infinity at its vanishing point 503 on the image. A cursor location 505 is mapped to point 504 on the viewing-line. The mapping depends on the initial configuration between the point to be moved and the cursor location. The angle between the viewing-line and the line segment joining cursor location 505 and point 504 shown in FIG. 8A is preserved for the mapping in the rest of the motion shown in FIG. 8B (point 504 and cursor location 505). As shown in FIG. 8B, a dashed line 506 shows the mapping angle, determined by the initial locations of point 504 and cursor 505. This avoids an initial discontinuity in mapping. When the user approaches the target point and initiates a move operation, closest point mapping causes a sudden jump on the mapped point because of the fixed angle requirement.

After the 2-D mapping, the 3-D point on viewing-line 502 projecting on mapped point 504 is found. If this point falls behind the camera it is simply discarded; otherwise the mapping is performed and the feature is moved to the computed point on the viewing-line.

View-Lock and Alignment for Polylines and Polygons

As the projection of a 3-D line segment is simply the 2-D line segment between the projection of its vertices, view-locking and alignment of polylines or polygons are implemented through their vertices, which are point primitives. A polyline can be easily manipulated by moving its vertices one-by-one. In the view-locked or lock-free alignment process the vertices are moved as they were isolated points, all the line-segments connecting at the vertex are simply reshaped with this motion. Even in the view-locking phase, it becomes possible to treat each vertex independently. In an implementation, a user can select (i) the line segments to be view-locked and the lock can be applied to the vertices in the selection, and (ii) any vertex to be view-locked independently.

View-Lock and Alignment for Smooth Curves

Figure 9:
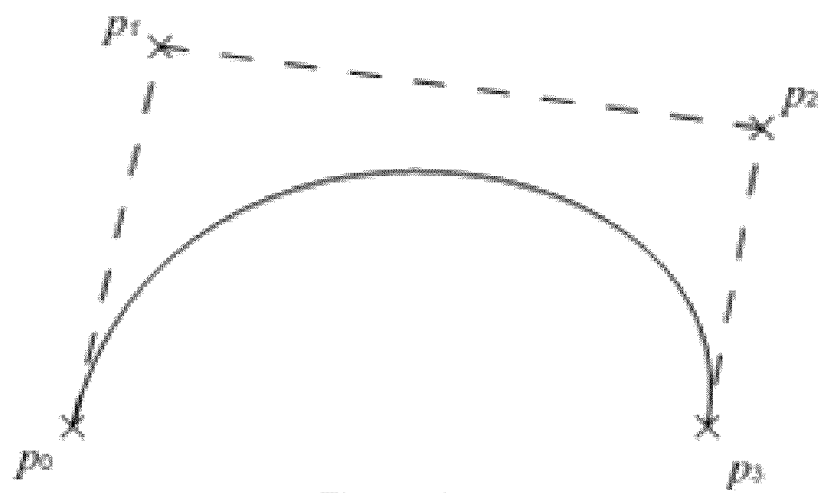
FIG. 9 shows a cubic Bezier curve in 2-D.

Bezier curves are common candidates for representing and drawing smooth curves in 2-D or 3-D. FIG. 9 shows a cubic Bezier and its four control points $p_0$, $p_1$, $p_2$ and $p_3$. The equation of the curve is given by:

$$p(t) = (1-t)^3 p_0 + 3(1-t)^2 t p_1 + 3(1-t) t^2 p_2 + t^3 p_3$$

The curve starts from control point $p_0$ when the parameter $t=0$, and ends at control point $p_3$ when the parameter $t=1$. The control points can be any dimension. In a specific implementation, 3-D control points give a 3-D Bezier curve. As shown in the equation, the curve is a linear function of its control points; therefore view-locking the control points is enough to keep its appearance constant on an orthographic or any other type of linear camera. In the presence of perspective camera view-locking the control points are not enough to lock the whole curve; but the error introduced is observed to be negligible for camera configurations seen in practice. Therefore control points are view-locked for locking the whole curve. This very simple locking procedure enables fast implementations of alignment. In cases of lock-free alignment, the control points of the curve are constrained to lie on the plane parallel to the active-camera and passing through the control point. In summary the point operations described are applied to each control point separately to implement the view-lock and alignment operations for the whole curve. More details on the point operations is discussed above in the View-lock and Alignment for Points section.

In the alignment operation the control points can be moved one-by-one independently. In an implementation, when one of the control points is moved, a new curve is generated and displayed. In another implementation, middle control points $p_1$ and $p_2$ are moved in parallel based on the motion of a point inside the curve being aligned. Let $v_p$ denote the motion vector of a point p(t) for t>0 and t<1 inside the curve. $v_p$ is computed by assuming that the point is being pulled independent from the rest of the curve. Then the magnitude of motion vectors $v_{p1}$ and $v_{p2}$ for control points $p_1$ and $p_2$ is set to be $|v_{p1}|=w_1|v_p|$ and $|v_{p2}|=w_2|v_p|$. The weights $w_1$ and $w_2$ satisfy $w_1+w_2=1$ and are given by:

$$\text{Let} \quad m = |p_1 - p_o| \quad u = \frac{p_1 - p_o}{m}$$

$$\text{then} \quad \omega_1 = \frac{(p - p_o) \cdot u}{m} \quad \omega_2 = \frac{(p - p_1) \cdot u}{m}$$

$$\text{then} \quad w_1 = \frac{\omega_1}{\omega_1 + \omega_2} \quad w_2 = \frac{\omega_2}{\omega_1 + \omega_2}$$

The direction of the motion vectors of the control points are determined by their viewing-lines if the curve is view-locked; otherwise they are just kept parallel to the motion vector $v_p$.

Automatic Alignment of Lines and Smooth Curves

Figure 10A:
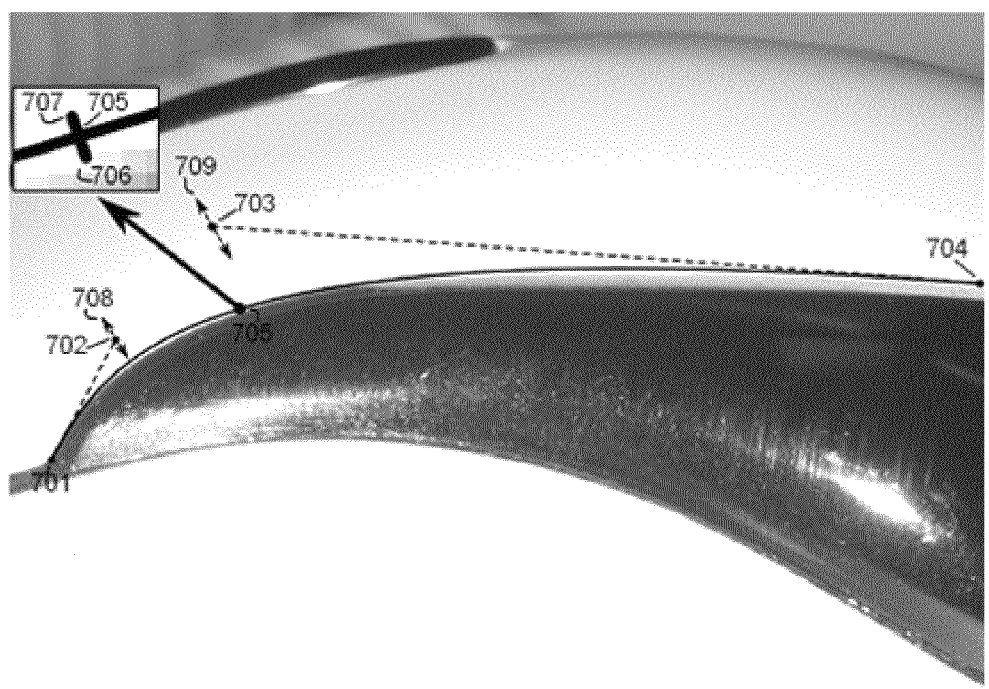
FIGS. 10A-10B shows an automatic alignment for curves.

The automatic alignment process is a search for the best curve that fits to the edge contours on the image. The criterion for the best alignment is based on the total edge strength along the curve. The edge strength for a 2-D point $p(t_i)$ on the curve is given by the directional derivative of the image along the normal $n(t_i)$ of the point $p(t_i)$. FIG. 10A shows a curve with control points 701, 702, 703, 704 being aligned over an image contour. The edge strength $s(t_i)$ on a point $p(t_i)$ 705 is given by the difference in intensity of points $a(t_i)$ and $b(t_i)$ marked as 706 and 707 respectively lying on the normal $n(t_i)$ to the curve. Formally, we have $$s(t_i) = \|I(a(t_i)) - I(b(t_i))\| \quad (1)$$

where I denotes the image. If the feature to be considered is not a step-edge but a line (e.g., a ridge) then $$s(t_i) = \left\| I(p(t_i)) - \frac{I(a(t_i)) + I(b(t_i))}{2} \right\| \quad (2)$$

The total strength of the curve is set to be the average edge strength S over the curve, given by $$S = \frac{\sum_{i=1}^{N-1} s(t_i) \|p(t_i) - p(t_{i-1})\|}{\sum_{i=1}^{N-1} \|p(t_i) - p(t_{i-1})\|}$$

where N is the number of point samples taken on the curve including the end points $p(t_0=0)$ and $p(t_{N-1}=1)$. The reason for the distance-based weighting is the non-uniform distribution of samples over the curve. Sampling uniformly over the Bezier curve parameter t is very practical but does not produce uniformly spaced samples in terms of the curve length. Table 1 below displays pseudo code for computing an edge strength of a curve or a line-segment. The function "point_edge_strength" in the code computes one of the above equations (1) and (2) given the image, the coordinate of the point on the curve, and the normal to the curve on the image plane at that point.

TABLE 1

```
double curve_edge_strength(curve, image, camera) {
    total_edge_strength = 0
    total_weight = 0
    for t = CURVE_STEP to 1 step CURVE_STEP {
        point = camera.project(curve.point(t))
        normal = curve.normal(t, camera)
        weight = length(point- camera.project(curve.point(t −
        CURVE_STEP)))
        edge_strength = point_edge_strength(point, normal, image)
        total_edge_strength = total_edge_strength + edge_strength
        total_weight = total_weight + weight
    }
    return total_edge_strength / total_weight
}
```

Figure 10B:

Two types of search strategies for automatic alignment can be used. In the first type of strategy, middle control points 703 and 708 are moved one by one in a window around the original control points. For a view-locked curve this corresponds to a 1-D motion shown by arrows 708 and 709 that corresponds to the projection of the viewing-line of the control point. If the curve is not locked the motion would be a 2 DOF motion on the image. A "one by one" motion is used. This avoids excessive computation because it is unnecessary to check all combinations. Finally, the resulting curves with the maximum total strength are chosen as the best curve. The result of the search for the initial curve in FIG. 10A is shown in FIG. 10B. In the second search strategy only end points 701 and 704 are moved similar to the middle control points to find the best curve. Table 2 displays pseudocode for an automatic alignment operation covering both search strategies. The automatic alignment can be for a curve or a line segment.

TABLE 2

```
void auto_align_contour(curve, free_control_points, free_control_ids
                        free_control_constraints, image, camera)
{
    for i = 1 to 2 step 1 {
        max_edge_strength = 0
        best_control_point = nil
        control_point = free_control_points[i]
        id = free_control_ids[i]
        control_constraint = free_control_constraints [i]
        for delta = −MAX_DELTA to +MAX_DELTA step
        STEP_DELTA {
            point = control_point + delta * control_constraint
            curve.set_control_point(point, id)
            edge_strength = curve_edge_strength(curve, image, cam-
            era)
            if edge_strength > max_edge_strength {
                max_edge_strength = edge_strength
                best_control_point = temp_point
            }
        }
        curve.set_control_point(best_control_point, id)
    }
}
```

It is possible to apply the automatic alignment procedure to line segments in a straight forward manner as they can be seen as linear curves with two control points. In principle, it is also straightforward to extend the automatic alignment to higher DOF curves with any type of parameterization as the implementation is a generic search in the parameter space.

View-Lock and Alignment for Surfaces

The lock and align operation of polygonal meshes and parametric surfaces are implemented as straightforward higher dimensional extensions of lock and align operations of polygonal boundaries or smooth parametric curves respectively.

Similar to the polylines or polygon curves the view-locking and alignment of polygonal meshes are implemented through their vertices, which are point primitives. A polygonal mesh corresponding to a tiling of the surface with small planar patches called faces. As each face is a plane bounded by a closed polygon one needs to preserve the appearance of the polygon on a locked view and a polygon can be locked by locking its vertices.

In the polygonal mesh, it possible to treat each vertex independently. In the view-locked or lock-free alignment process the vertices are moved as if they were isolated points, all the edges connecting at the vertex are simply reshaped with this motion. In the view-locking operation, a user can select (i) the faces to be view-locked and the lock can be applied to the vertices of the faces in the selection, and (ii) any vertex to be view-locked independently.

Locking and aligning of parametric surfaces is performed through their control points. If he surface is a linear function of its control points, as in the case of NURBS or similar parametric representations; view-locking the control points is enough to keep its appearance constant on an orthographic or any other type of linear camera. In the presence of perspective camera an error introduced but it is observed to be negligible for camera configurations seen in practice. If the parametric surface is not represented as a linear combination of a set of control points, one could still be able to find a way to lock the whole surface.

A parametric surface should be locked as a whole by constraining its control points to their viewing-lines. In the alignment phase it is possible to move each control point independently or collectively by distributing a motion vector over all the control points. The motion vector corresponds to a pulling operation applied by the user. Distance in to pulling point can be used as weighting factor in the distribution of the motion over the control points.

Manipulating and shaping a surface vertex by vertex is a very time consuming operation therefore surfaces are usually manipulated using higher level tools such as smoothing, subdivision schemes and sculpturing operators. The possible operations that can be applied on a surface are countless. In the presence of a view-lock these operations should be modified so that the vertices of the mesh or the control points of the smooth surface remain on their viewing-lines. In an implementation of the present invention, the mesh smoothing is coupled with the view-lock constraint by minimizing the smoothing objective over the viewing-lines.

Image Matching

A basic rule in image-based 3-D reconstruction is color consistency in the projection of a surface on the photographs. Ideally, when a point on the surface of the object is projected on the photographs taken at the same lighting conditions, the color content of the photographs at the projection point should be consistent. Ideally 3-D reconstruction of an object corresponds to a search to find the 3-D surfaces that have a color-consistent projection on the available photographs. Note that, depending on the number of available photographs, reconstruction is an ill-posed problem as there may be multiple surfaces with the same appearance.

The definition of consistency depends on the reflection properties of the surface. In case of a Lambertian surface, the consistency is expressed ideally as equality of color content; because the Lambertian surfaces have the same color from all directions of view. In practice, due to various sources of imperfections such as motion blur, variance in lighting condition and sensor noise the equivalence in color is replaced by minimization of color difference normalized in some manner. In practice, 3-D reconstruction of an object corresponds to a search to find the 3-D surfaces that have minimal color difference over multiple photographs. The process is usually referred to as image matching. Specular or mirror like or transparent surfaces has more complex definitions of consistency as the color of a point depends on the viewing direction. Such surfaces are currently not used in practice but there is an ongoing research on the robust reconstruction of specular or semitransparent surfaces.

Image matching forms the basis of image-based 3-D modeling systems. Various unavoidable sources of error such as violation of Lambertian surface assumption, discontinuities in depth, unknown visibility maps of objects and lack of texture makes the image matching a very complex and fragile process; however, the present invention opens a way to user controlled manual image matching eliminating some of the difficulties associated with depth discontinuities and visibility.

In an implementation of view-lock-based image matching the user creates a polygonal mesh surface then brings it to a state roughly similar to the real surface of the object. The initial surface matches at least two images with a few pixels of error. The surface should be visible on both views and it should not include any depth discontinuities, which are usually called occlusion boundaries. The content of the surface should be close to Lambertian and textured enough; without a texture it becomes impossible to find the correct surface as any part of the surface matches any other part on the images with a small error. Then the user locks the surface on one of the photographs. Finally the user runs the image matching command on the other photograph.

Figure 11A:
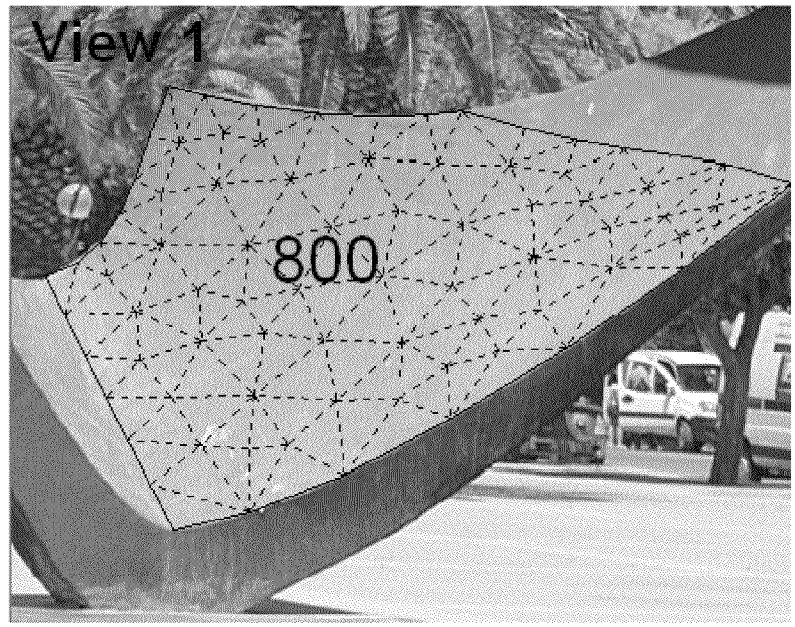
FIGS. 11A-11F show an example image matching process.
Figure 11B:
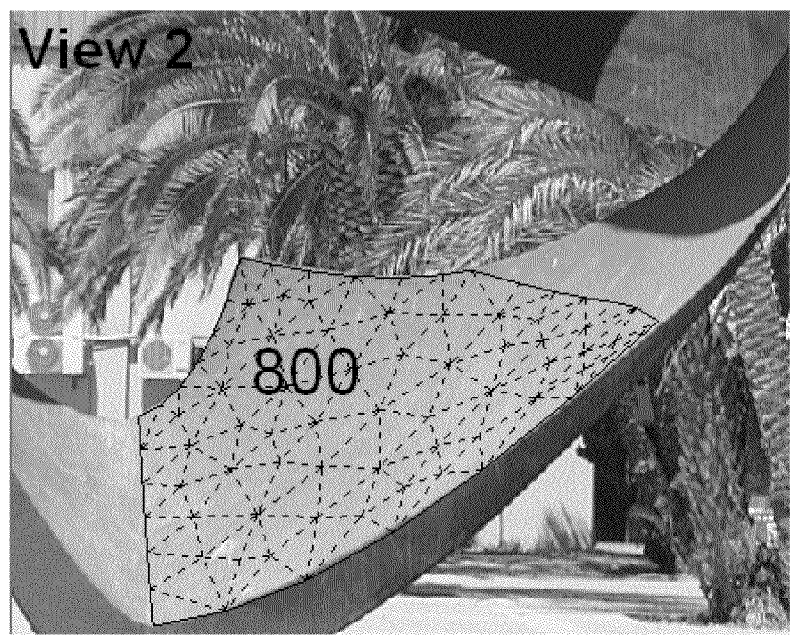
Figure 11C:
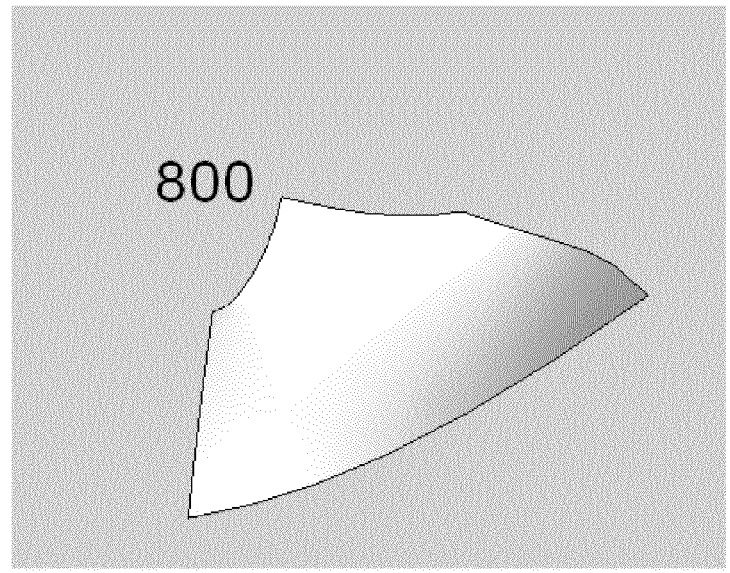
Figure 11D:
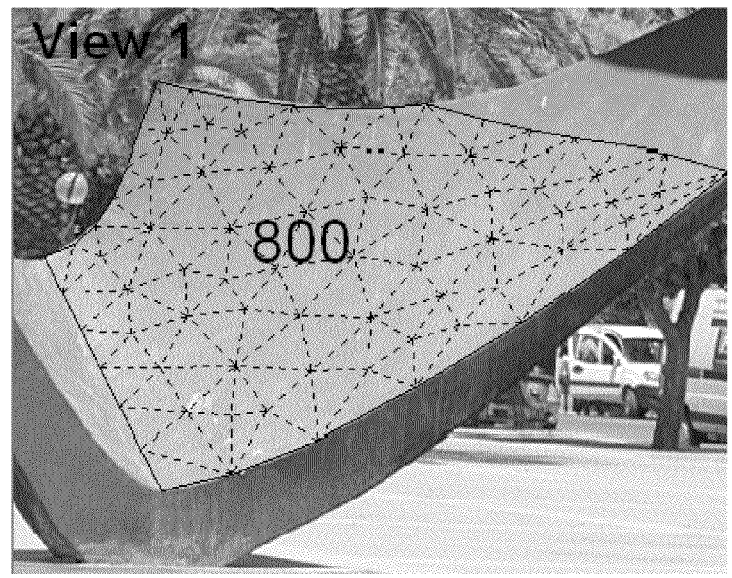
Figure 11E:
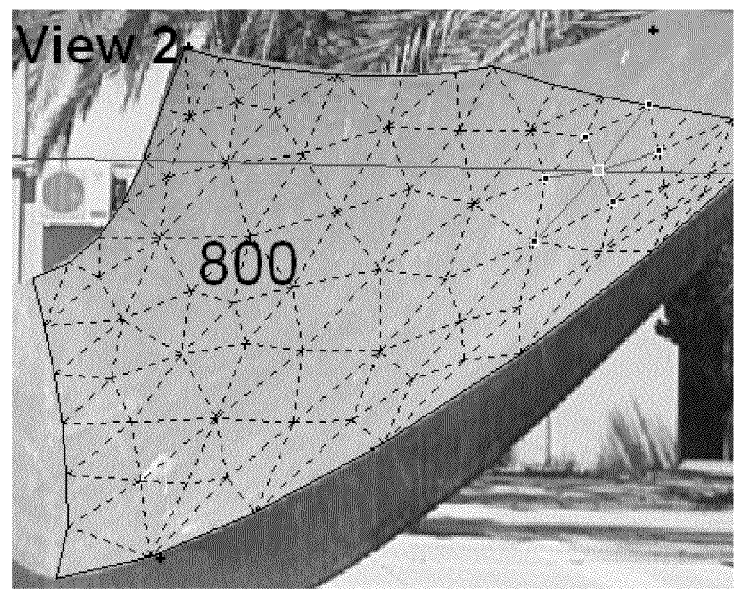
Figure 11F:
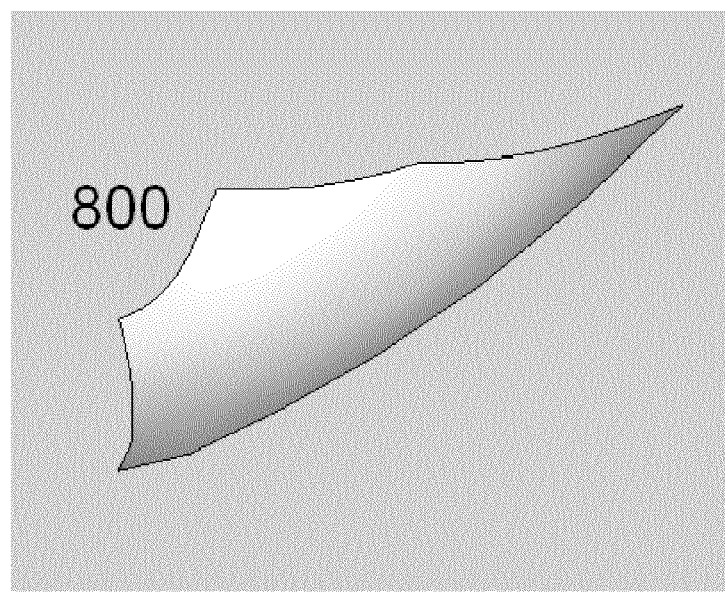

The image matching process is demonstrated in FIGS. 11A through 11F. FIG. 11A and FIG. 11B show the polygonal mesh 800 overlaid on two different photographs namely view 1 and view 2 respectively. The appearance of the mesh on two images almost fits the corresponding part of the statue; however the surface 800 shown in FIG. 11C does not exactly have same shape with the statue. The statute has a concave surface but the left hand side surface 800 does not have any concavity. The result of image matching is shown in FIGS. 11D to 11F. The surface is locked over the view 1 in FIG. 11A and is image matching is applied on the view 2 in FIG. 11B. After the image matching process the new mesh has exactly the same appearance on view 1 as shown in FIG. 11D. In view 2 shown in FIG. 11E, it can be observed that the appearance of the new mesh matches the statute much better than the one shown in FIG. 11B. The surface 800 shown in FIG. 11F now closely approximates the surface of the statue. The concavity of the statute can be easily observed in FIG. 11F.

In image matching an objective function C given by $$C = \Sigma_v s C_v$$

is minimized. The $C_v$ in the formula denotes a cost term associated with a vertex v in the mesh. In the optimization process the vertices in the mesh are moved to a location with a smaller total cost C. The cost associated with each vertex has two components given by:

$$C_v = \Sigma_f C_f \Sigma_e C_e$$

where $C_f$ denotes the total color difference of face computed on two images and $C_e$ denotes the cost associated with the smoothness of the surface. Higher values of weight makes the surface more difficult to bend, resulting in a smoother surface. If the weight were set to be zero the surface would be completely elastic but sensitive to noise in the images.

The smoothness is measured in terms of the difference between the normals $n_1$ and $n_2$ of the two faces connected to an edge and is given by $$C_e = {n_1 - n_2}^2$$

Finally the color difference cost $C_f$ is given by $$C_f = \Sigma_p I_l p^l - I_c p_f^{c\,2}$$

where $I_l p^l$ and $I_c p^C$ are the color values $I_{l'}$ and $I_{l'}$ of the projection of a point p on face f on the locked view/and the current view C. f is a constant color offset to compensate for the difference in average color of the face f on two images. The purpose of f is to compensate for the difference in lighting conditions of the two photographs as pictures of an object taken at exactly the same instance in time are rarely available.

The image matching cost provided is just simple example to demonstrate and verify the idea. One of ordinary skill in the art would recognize other objective functions that may similarly be used capture the shape of the object using image matching.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method comprising:
    providing a 3-D drawing based on 2-D images of a scene taken from multiple different views, wherein the 3-D drawing has a plurality of 3-D drawing primitives, and the 2-D images comprise at least a first 2-D image comprising a first point of the scene from a first view and a second 2-D image comprising the first point of the scene from a second view, different from the first view;
    permitting the 3-D drawing primitives to be drawn on a computer screen as a polygonal mesh and the polygonal mesh is overlaid on the 2-D images;
    using a computer, allowing a user to manipulate a 3-D drawing primitive in a view-locked mode, wherein in the view-locked mode, altering of an appearance of the 3-D drawing primitive occurs without changing its appearance on a selected input image;
    allowing the user to move the 3-D drawing primitive in 3-D under a locked constraint to match its appearance to corresponding features on other 2-D images;
    allowing view-locking of the 3-D drawing primitive on one 2-D image while aligning on the another 2-D image;
    allowing moving of the 3-D drawing primitive on a 3-D plane parallel to a current viewing camera to match its appearance to the corresponding features on other images; and
    allowing display on the computer screen a surface corresponding to the polygonal mesh of the 3-D drawing primitive, without a 2-D image overlay.

2. The method of claim 1 comprising:
    allowing repeatedly view-locking of the 3-D drawing primitive on other views to improve reconstruction accuracy.

3. The method of claim 1 wherein the 3-D drawing primitive to be reconstructed is a point.

4. The method of claim 1 wherein the 3-D drawing primitive to be reconstructed is at least one of a polyline or polygon.

5. The method of claim 1 wherein the 3-D drawing primitive to be reconstructed is a smooth curve comprising a Bezier curve, NURBS, Spline, or B-spline.

6. The method of claim 1 comprising:
    allowing automatic alignment of primitives to the edges on the 2-D images through a search for the best primitive along which an edge strength is maximum.

7. The method of claim 1 comprising:
    allowing mapping of 2-D cursor locations to points on a 3-D line.

8. The method of claim 1 wherein the allowing a user to manipulate a 3-D drawing primitive in a view-locked mode, wherein in the view-locked mode, altering of an appearance of the 3-D drawing primitive occurs without changing its appearance on a selected input image comprises:
    specifying a projection of the 3-D drawing primitive on at least one of the first 2-D image or second 2-D image, wherein the 3-D drawing primitive comprises a geometric primitive.

9. The method of claim 8 comprising:
    permitting moving of the 3-D drawing primitive in 3-D in the view-locked mode.

10. The method of claim 8 comprising:
    reconstructing smooth surfaces of the 3-D drawing primitives through the use of color consistency in the view-locked mode.

11. The method of claim 1 comprising:
    allowing automatic alignment of primitives to the edges on the 2-D images through a search for the best primitive along which an edge strength is maximum, wherein the primitives comprise smooth curves.

12. The method of claim 1 comprising:
    allowing automatic alignment of primitives to the edges on the 2-D images through a search for the best primitive along which an edge strength is maximum, wherein the primitives comprise polygons.

13. The method of claim 1 comprising:
    allowing mapping of 2-D screen coordinates to points on a viewing-ray of a view-locked 3-D drawing primitive.

14. The method of claim 1 wherein the allowing view-locking of the 3-D drawing primitive on one 2-D image while aligning on the another 2-D image occurs before the allowing moving of the 3-D drawing primitive on a 3-D plane parallel to a current viewing camera to match its appearance to the corresponding features on other images.

15. The method of claim 1 wherein the allowing view-locking of the 3-D drawing primitive on one 2-D image while aligning on the another 2-D image further comprises:
    allowing the user to select the 3-D primitive shown from a first 2-D image, wherein the 3-D drawing comprises the first and second 2-D images; and
    while displaying to the user a screen with the 3-D primitive from the first 2-D image, allowing the user to perform a first alignment modification to match the 3-D primitive with another 3-D primitive from the second 2-D image while showing changes to the second 2-D image on the screen, but not changes to the first 2-D image on the screen.

16. The method of claim 1 wherein the view-locked mode maintains the appearance of the 3-D primitive on a perspective camera view.

17. The method of claim 1 wherein the allowing moving of the 3-D drawing primitive on the 3-D plane parallel to the current viewing camera to match its appearance to the corresponding features on other images comprises moving of the 3-D drawing primitive on the 3-D plane parallel to the current viewing camera to match its appearance with a third 2-D image, different than the first and second 2-D images, wherein the third 2-D image comprises a third point of the scene from a third view.

18. The method of claim 1 wherein the 3-D drawing of the scene includes at least one concave surface.

19. A method comprising:
providing a 3-D drawing based on 2-D camera views of a scene taken from multiple different views, wherein the 3-D drawing has a plurality of 3-D drawing primitives, and the 2-D camera views comprise at least a first 2-D camera view comprising a first point of the scene from a first view and a second 2-D camera view comprising the first point of the scene from a second view, different from the first view;
permitting the 3-D drawing primitives to be drawn on a computer screen as a polygonal mesh and the polygonal mesh is overlaid on the 2-D camera views;
using a computer, allowing a user to manipulate a 3-D drawing primitive in a view-locked mode, wherein in the view-locked mode, altering of an appearance of the 3-D drawing primitive occurs without changing its appearance on a selected input image;
allowing the user to move the 3-D drawing primitive in 3-D under a locked constraint to match its appearance to corresponding features on other 2-D camera views;
allowing view-locking of the 3-D drawing primitive on one 2-D camera view while aligning on the another 2-D camera view;
allowing moving of the 3-D drawing primitive on a 3-D plane parallel to a current viewing camera to match its appearance to the corresponding features on other images; and
allowing display on the computer screen a surface corresponding to the polygonal mesh of the 3-D drawing primitive, without a 2-D image overlay.

20. The method of claim 19 wherein camera views are without 2-D images previously taken that correspond to the camera views.

21. The method of claim 19 wherein the allowing a user to manipulate a 3-D drawing primitive in a view-locked mode, wherein in the view-locked mode, altering of an appearance of the 3-D drawing primitive occurs without changing its appearance on a selected input image comprises:
specifying a projection of the 3-D drawing primitive on at least one of the first 2-D camera view or second 2-D camera view, wherein the 3-D drawing primitive comprises a geometric primitive.

22. The method of claim 21 comprising:
permitting moving of the 3-D drawing primitive in 3-D in the view-locked mode.

23. The method of claim 21 comprising:
reconstructing smooth surfaces of the 3-D drawing primitives through the use of color consistency in the view-locked mode.

24. A computer-implemented method comprising:
providing a 3-D drawing based on 2-D images of a scene taken from multiple different views, wherein the 3-D drawing has a plurality of 3-D drawing primitives, and the 2-D images comprise at least a first 2-D image comprising a first point of the scene from a first view and a second 2-D image comprising the first point of the scene from a second view, different from the first view;
permitting the 3-D drawing primitives to be drawn on a computer screen as a polygonal mesh and the polygonal mesh is overlaid on the 2-D images;
using a computer, allowing a user to manipulate a 3-D drawing primitive in a view-locked mode, wherein in the view-locked mode, altering of an appearance of the 3-D drawing primitive occurs without changing its appearance on a selected input image;
specifying a projection of the 3-D drawing primitive on at least one of the first 2-D image or second 2-D image, wherein the 3-D drawing primitive comprises a geometric primitive;
allowing the user to move the 3-D drawing primitive in 3-D under a locked constraint to match its appearance to corresponding features on other 2-D images;
allowing view-locking of the 3-D drawing primitive on one 2-D image while aligning on the another 2-D image;
allowing moving of the 3-D drawing primitive on a 3-D plane parallel to a current viewing camera to match its appearance to the corresponding features on other images;
allowing reconstructing smooth surfaces of the 3-D drawing primitives through the use of color consistency in the view-locked mode;
allowing automatic alignment of primitives to the edges on the 2-D images through a search for the best primitive along which an edge strength is maximum, wherein the primitives comprise smooth curves; and
allowing display on the computer screen a surface corresponding to the polygonal mesh of the 3-D drawing primitive, without a 2-D image overlay.

25. The method of claim 24 wherein the smooth curves are represented by an equation:

$$p(t)=(1-t^3)p_0+3(1-t)^2tp_1+3(1-t)t^2p_2+t^3p_3,$$

wherein $p_0$, $p_1$, $p_2$ and $p_3$ represent control points and t represents a parameter,
and the allowing a user to manipulate a 3-D drawing primitive in a view-locked mode comprises:
constraining motion on a line and given a 3-D point $p_0$, the line is represented by an equation:

$$p = p_0 + \lambda \frac{p_0 - o}{\|p_0 - o\|},$$

wherein $\lambda$ represents a single depth-of-field, and o represents an optical center of the camera.

* * * * *